C. B. DAHLGREN.
CONDENSERS FOR FUMES OF MERCURY.

No. 173,769. Patented Feb. 22, 1876.

Witnesses
Geo. H. Strong.
Jno. L. Borie

Inventor
Charles B. Dahlgren
by Dewey
his Attorney

UNITED STATES PATENT OFFICE.

CHARLES B. DAHLGREN, OF SAN FRANCISCO, CALIFORNIA, ASSIGNOR OF ONE-HALF HIS RIGHT TO E. N. RIOTTE, OF SAME PLACE.

IMPROVEMENT IN CONDENSERS FOR FUMES OF MERCURY.

Specification forming part of Letters Patent No. 173,769, dated February 22, 1876; application filed November 15, 1875.

*To all whom it may concern:*

Be it known that I, CHARLES B. DAHLGREN, of San Francisco city and county, State of California, have invented an Improvement in Condensers; and I do hereby declare the following description and accompanying drawings are sufficient to enable any person skilled in the art or science to which it most nearly appertains to make and use my said invention or improvement without further invention or experiment.

My invention relates to an improved condenser for cooling heated vapors or fumes to a temperature at which they are precipitated or become liquid; and it consists in constructing the condensing-chamber either partially or wholly of an absorbent material, which is kept constantly saturated with water, so as to produce a refrigeratory effect inside of the chamber by the evaporation of the water from the surrounding surface or surfaces. In the present instance I have represented the application of my improvement in connection with an ordinary retort for separating quicksilver from gold and silver amalgam.

Figure 1:
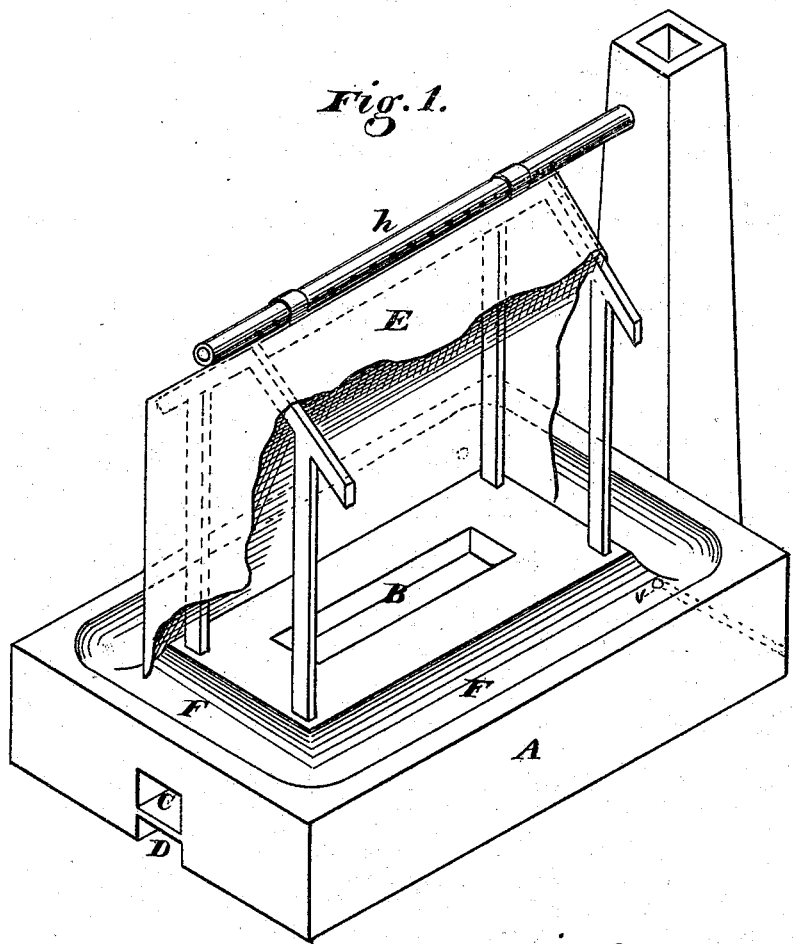
Figure 2:
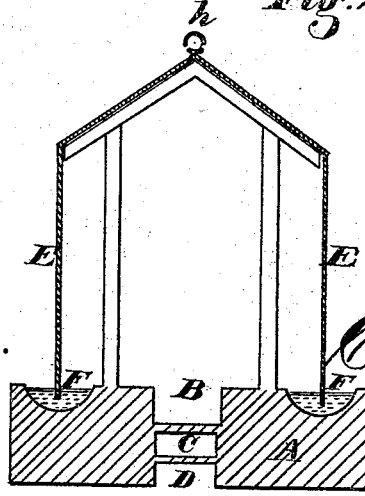

In the drawing, Figure 1 is a perspective view of my device. Fig. 2 is a transverse section.

A is the base of the retort, which can be variously constructed. B is the open basin or retort in which the amalgam is to be retorted is placed. C is the furnace below the open basin or retort, and D is the ash-pit. Upon the base A I construct a simple frame-work, which is capable of supporting a housing, E, which is made of absorbent material, such as canvas, woolen, cotton, or other fibrous or other equivalent textile fabric which will absorb water. In the base A I make a channel, F, which extends entirely around the retort or basin, and this channel I keep filled with water. The housing E is so suspended or adjusted that its lower edge will enter the water in the channel and thus prevent the escape of any of the vapors or fumes beneath it. Above the housing E I lead one or more perforated water-pipes, *h*, in such a manner that they will deliver a constant spray or stream of water upon the housing, and thus keep it saturated.

The surplus water will flow down the sides of the housing and be caught in the channel F, into which the lower edge of the housing dips, and a waste pipe or pipes *v* will be supplied to carry away the surplus water from the channel.

The evaporation of the moisture from the housing will create a refrigeratory action inside the chamber, inside of which the fumes are generated or delivered, so that they will be condensed against the inside of the housing, and flow down its sides into the channel F; or inclined planes or shelves may be arranged inside of the chamber, upon which the condensed material will settle and be directed by them into the channel.

A condenser of this kind can be applied wherever it is desired to condense vapors or fumes. It can be cheaply constructed, while its action will be superior to that of any of the ordinary methods of condensing vapors.

Having thus described my invention, what I claim, and desire to secure by Letters Patent, is—

1. A fume or vapor condenser having its walls and top composed either wholly or partially of an absorbent material, E, in combination with one or more water-pipes, *h*, substantially as and for the purpose described.

2. The housing E of a fume or vapor condenser composed of absorbent material, having its lower edge or edges submerged in a water-channel, in combination with one or more water-pipes, *h*, substantially as and for the purpose described.

CHARLES B. DAHLGREN.

Witnesses:
GEO. H. STRONG,
JNO. L. BOONE.